US007675577B2

(12) United States Patent
Yang

(10) Patent No.: US 7,675,577 B2
(45) Date of Patent: Mar. 9, 2010

(54) DEVICE AND METHOD FOR AUTOMATICALLY CHANGING BROADCAST CHANNEL OF VEHICLE TELEVISION WITH DIVERSITY ANTENNA

(75) Inventor: Hyun Po Yang, Icheon-shi (KR)

(73) Assignee: Hyundai Autonet Co., Ltd., Icheon-Shi, Kyungki-Do (KR)

( * ) Notice: Subject to any disclaimer, the term of this patent is extended or adjusted under 35 U.S.C. 154(b) by 1021 days.

(21) Appl. No.: 11/277,354

(22) Filed: Mar. 23, 2006

(65) Prior Publication Data
US 2006/0227255 A1    Oct. 12, 2006

(30) Foreign Application Priority Data
Apr. 8, 2005    (KR) ............... 10-2005-0029530

(51) Int. Cl.
H04N 5/44    (2006.01)
H04N 5/50    (2006.01)
(52) U.S. Cl. ............... 348/725; 348/729; 348/837; 348/553; 348/731; 348/706; 725/75; 725/72; 455/277.1; 455/277.2
(58) Field of Classification Search ............... 348/837, 348/553, 552, 725, 729, 731, 732, 705, 706, 348/14.11; 725/75, 72; 455/193.1, 184.1, 455/277.1, 277.2; 375/299, 347; 701/213, 701/215, 216
See application file for complete search history.

(56) References Cited

U.S. PATENT DOCUMENTS

| | | | | |
|---|---|---|---|---|
| 5,818,543 A | * | 10/1998 | Lee | 348/725 |
| 5,949,498 A | * | 9/1999 | Rudolph | 348/725 |
| 7,239,356 B2 | * | 7/2007 | Kubota et al. | 348/564 |

FOREIGN PATENT DOCUMENTS

| | | |
|---|---|---|
| JP | 10-210325 | 8/1998 |
| KR | 100311151 | 9/2001 |
| KR | 1020020070896 | 9/2002 |
| KR | 1020040023336 | 3/2004 |

* cited by examiner

Primary Examiner—M. Lee
Assistant Examiner—Jean W Désir
(74) Attorney, Agent, or Firm—IPLA P.A.; James E. Bame

(57) ABSTRACT

A device and method for automatically changing a broadcast channel of a vehicle television with a diversity antenna is provided. The device includes an antenna switching unit connected with the diversity antennas and switching one of the diversity antennas; an image signal level detector for detecting an image signal level; an audio signal level detector for detecting an audio signal level; a storage unit for storing regional broadcast channel information, a channel change history, a value of number of switching times; and a controller for controlling the antenna switching unit, counting and storing the number of switching times, checking a quality of the broadcast signal, deciding a desired broadcast channel, and controlling the tuner to change into the decided broadcast channel.

11 Claims, 4 Drawing Sheets

DEVICE AND METHOD FOR AUTOMATICALLY CHANGING BROADCAST CHANNEL OF VEHICLE TELEVISION WITH DIVERSITY ANTENNA

BACKGROUND OF THE INVENTION

1. Field of the Invention

The present invention relates to a vehicle television using a diversity antenna, and more particularly, to a device and method for automatically changing a reception broadcast channel of a vehicle television with a diversity antenna when an image signal and a voice signal have much noises and the diversity antenna has many number of switching times.

2. Description of the Related Art

As an industrial technology develops and a general public's life is rich, a car becomes a necessity to general public. The general public increasingly spends a time in the car on business and/or to enjoy leisure. As the time spent in the car is increased, it is a trend that a vehicle car audio system is installed as a basic specification to relieve boredom during car driving, and a vehicle television is also much installed in recent years.

However, due to a characteristic of a vehicle, that is, due to vehicle's sequential turning while driving at a fast speed, it is difficult to receive a television broadcast signal while driving. In order to solve such a drawback, put on a market is being a vehicle television with a plurality of diversity antennas, for switching the antenna outputting a good quality of broadcast signal and receiving the broadcast signal with a different directionality.

The vehicle television determines a quality of the broadcast signal using a vertical sync signal of the broadcast signal for the same broadcast channel received through each of the diversity antennas, switches the antenna receiving the good quality of broadcast signal, and receiving the broadcast signal through the switched antenna.

As described above, the vehicle television receives the broadcast signal for the same broadcast channel. In case where, due to vehicle movement, the broadcast channel for the same broadcasting station is changed, thereby deteriorating the quality of broadcast signal or making it difficult to receive the broadcast signal, a driver should directly manipulate a channel key and search for the changed channel.

Due to this, the driver turns his/her eyes to the television during driving and therefore, there is a drawback of lack of driver's concentration and occurrence of a traffic accident.

In order to solve this drawback, there has been proposed a method in which a region using a different broadcast channel for the same broadcasting station is defined, a current position is measured using a global positing system (GPS), and a broadcast channel is automatically changed to the broadcast channel of the region corresponding to the measured position.

In case where the method uses the GPS, it is advantageous of automatically accurately changing the broadcast channel on a per-preset region basis, but has a drawback in that, even when a good quality of broadcast signal is substantially received at a boundary between regions, the broadcast channel is changed.

SUMMARY OF THE INVENTION

Accordingly, the present invention is directed to a device and method for automatically changing a broadcast channel of a vehicle television with a diversity antenna that substantially overcomes one or more of the limitations and disadvantages of the conventional art.

One object of the present invention is to provide a device and method for automatically changing a reception broadcast channel of a vehicle television with a diversity antenna when an image signal and a voice signal have much noises and the diversity antenna has many number of switching times.

Another object of the present invention is to provide a device and method for, when an image signal and a voice signal have much noises and a diversity antenna has many number of switching times, automatically changing a broadcast channel of a vehicle television with the diversity antenna into a broadcast channel of a corresponding region of a position that is measured using a global positioning system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve the above and other objects and advantages, and in accordance with the purpose of the invention, as embodied and broadly described herein, there is provided a device for automatically changing a broadcast channel of a vehicle television with a diversity antenna, the device including: an antenna switching unit connected with the diversity antennas and switching one of the diversity antennas under a predetermined control; a tuner for receiving a radio broadcast signal through the switched antenna, and detecting a broadcast signal for a predetermined broadcast channel under a predetermined control; an image processor for detecting an image signal from the broadcast signal; an audio processor for detecting an audio signal from the broadcast signal; an image signal level detector for detecting a signal level of the image signal; an audio signal level detector for detecting a signal level of the audio signal; a storage unit for storing regional broadcast channel information for each broadcasting station, a channel change history, a value of number of switching times depending on a switching control operation, first and second reference levels for each of the image signal and the audio signal, and a value of a reference number of switching times; and a controller for controlling the antenna switching unit to switch one of a plurality of the diversity antennas, counting and storing the number of switching times in the storage unit, checking a quality of the broadcast signal and, when it is determined that the quality is less than a predetermined reference level, deciding a desired broadcast channel with reference to the regional broadcast channel information for each broadcasting station, and controlling the tuner to change the broadcast channel into the decided broadcast channel.

In another aspect of the present invention, there is provided a device for automatically changing a broadcast channel of a vehicle television with a diversity antenna, the device including: an antenna switching unit connected with the diversity antennas and switching one of the diversity antennas under a predetermined control; a tuner for receiving a radio broadcast signal through the switched antenna, and detecting a broadcast signal for a predetermined broadcast channel under a predetermined control; an image processor for detecting an image signal from the broadcast signal; an audio processor for detecting an audio signal from the broadcast signal; an image signal level detector for detecting a signal level of the image signal; an audio signal level detector for detecting a signal level of the audio signal; a storage unit for storing regional broadcast channel information for each broadcasting station, a channel change history, a value of number of switching times depending on a switching control operation, first and second reference levels for each of the image signal and the audio signal, and a value of a reference number of switching times; a GPS (global positioning system) module for receiving each position signal from a plurality of GPS satellites, and calculating a self position; and a controller for controlling the antenna switching unit to switch one of a plurality of the diversity antennas, counting and storing the number of switching times in the storage unit, checking a quality of the broadcast signal and, when it is determined that the quality is less than a predetermined reference level, deciding a desired broadcast channel of a corresponding region of the calculated position with reference to the regional broadcast channel information for each broadcasting station, and controlling the tuner to change the broadcast channel into the decided broadcast channel.

In a further another aspect of the present invention, there is provided a method for automatically changing a broadcast channel of a vehicle television with a diversity antenna and a storage unit for storing regional broadcast channel information for each broadcasting station, a channel change history, a value of number of switching times depending on a switching control operation, first and second reference levels for each of the image signal and the audio signal, and a value of a reference number of switching times, the method including the steps of: receiving an image signal and an audio signal through a switched antenna, and measuring signal levels of the image signal and the audio signal; determining whether or not the measured image and audio signal levels are less than the first and second reference levels; when the measured image and audio signal levels are less than the first and second reference levels, determining whether or not a counted number of switching times is more than the reference number of switching times; and when the counted number of switching times is less than the reference number of switching times, increasing the counted number of switching times by 1 and, when the counted number of switching times is more than the reference number of switching times, deciding one of regional broadcast channels of the broadcasting station for a present reception channel with reference to the regional broadcast channel information for the broadcasting stations, and changing the broadcast channel into the decided broadcast channel.

In a still further another aspect of the present invention, there is provided a method for automatically changing a broadcast channel of a vehicle television with a diversity antenna, a GPS (global positioning system) module for receiving each position signal from a plurality of GPS satellites and calculating a self position, and a storage unit for storing regional broadcast channel information for each broadcasting station, a channel change history, a value of number of switching times depending on a switching control operation, first and second reference levels for each of the image signal and the audio signal, and a value of a reference number of switching times, the method including the steps of: receiving an image signal and an audio signal through a switched antenna, and measuring signal levels of the image signal and the audio signal; determining whether or not the measured image and audio signal levels are less than the first and second reference levels; when the measured image and audio signal levels are less than the first and second reference levels, determining whether or not a counted number of switching times is more than the reference number of switching times; and when the counted number of switching times is less than the reference number of switching times, increasing the counted number of switching times by 1 and, when the counted number of switching times is more than the reference number of switching times, searching a region of the calculated position from the regional broadcast channel information for the broadcasting stations, deciding a desired broadcast channel, and changing the broadcast channel into the decided broadcast channel.

It is to be understood that both the foregoing summary and the following detailed description of the present invention are merely exemplary and intended for explanatory purposes only.

BRIEF DESCRIPTION OF THE DRAWINGS

The accompanying drawings, which are included to aid in understanding the invention and are incorporated into and constitute a part of this application, illustrate embodiment(s) of the invention and together with the description serve to explain the principles of the invention. In the drawings.

DETAILED DESCRIPTION OF THE INVENTION

Figure 1:
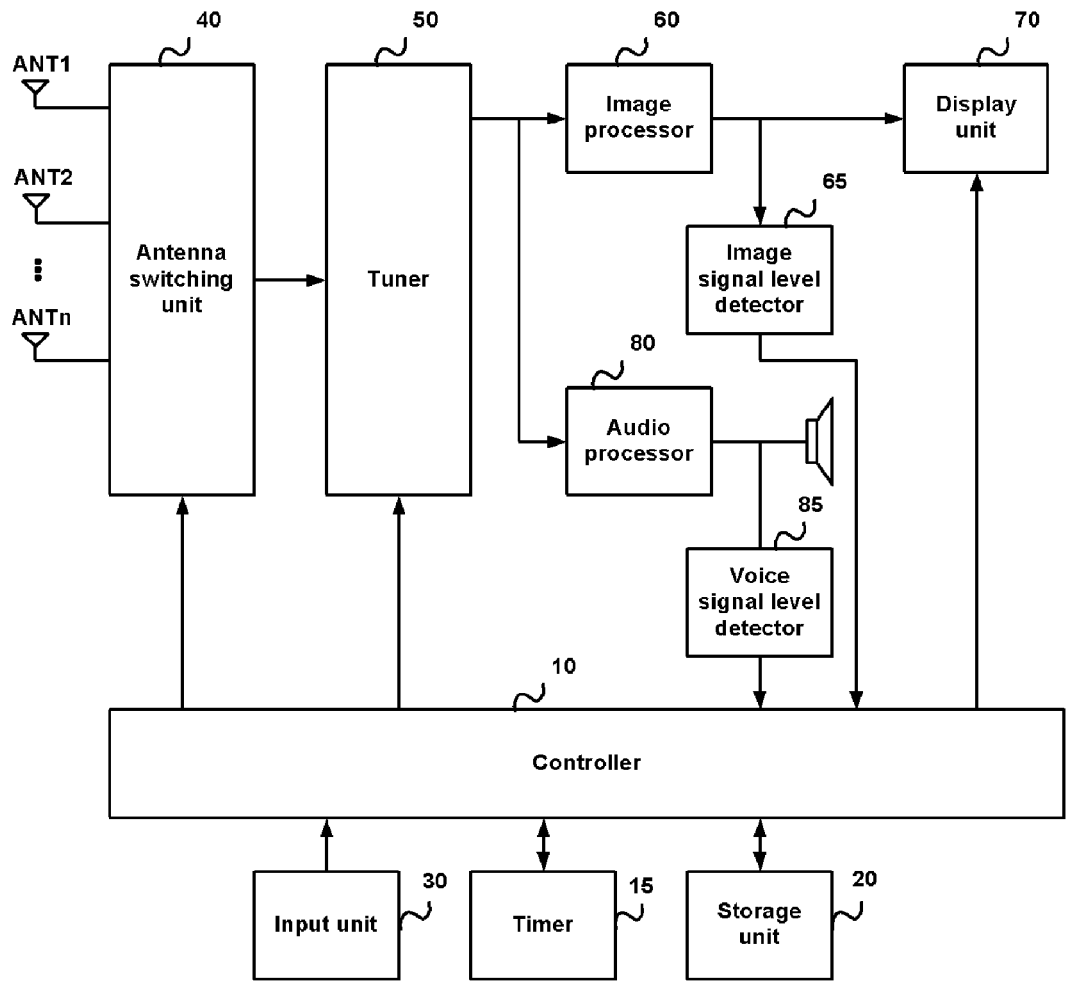
FIG. 1 illustrates a construction of a device for automatically changing a broadcast channel of a vehicle television with a diversity antenna according to the first embodiment of the present invention.

Reference will now be made in detail to the preferred embodiments of the present invention, examples of which are illustrated in the accompanying drawings. Wherever possible, the same reference numerals will be used throughout the drawings to refer to the same or like parts.

In the first embodiment of the present invention, a predetermined antenna is switched by a switching control operation from a plurality of diversity antennas, an image signal and a voice signal are separated from a broadcast signal received through the switched predetermined antenna, a signal level of the voice signal and a signal level of the image signal are detected respectively and, if the detected signal levels are lower than preset reference levels respectively and the switched antenna has the number of switching times more than a predetermined number of switching times, a broadcast channel is changed with reference to previously stored regional broadcast channel information.

In the second embodiment of the present invention, a predetermined antenna is switched by a switching control operation from a plurality of diversity antennas, an image signal and a voice signal are separated from a broadcast signal received through the switched predetermined antenna, a signal level of the voice signal and a signal level of the image signal are detected respectively and, if the detected signal levels are lower than preset reference levels respectively and the switched antenna has the number of switching times more than a predetermined number of switching times, a current position is measured using a GPS system, a region of the measured position is determined, and a broadcast channel is changed into a broadcast channel of the determined region.

Hereinafter, a construction and an operation of a device for automatically changing the broadcast channel of the vehicle television with the diversity antenna according to the present invention with reference to the attached drawings.

FIG. 1 illustrates a construction of the device for automatically changing the broadcast channel of the vehicle television with the diversity antenna according to the first embodiment of the present invention.

Referring to FIG. 1, the inventive device includes a controller 10, a timer 15, a storage unit 20, an input unit 30, an antenna switching unit 40, a tuner 50, an image processor 60, an image signal level detector 65, an audio processor 80, an audio signal level detector 85, and a display unit 70.

The controller 10 controls a general operation for automatically changing the broadcast channel of the vehicle television with the diversity antenna according to the present invention.

The timer 15 counts a time under the control of the controller 10, and provides the counted time to the controller 10.

The storage unit 20 includes a region for storing a control program for automatically changing the broadcast channel of the vehicle television with the diversity antenna, a region for temporarily storing data generated in execution of the control program, and a region for storing regional broadcast channel information for each broadcasting station, a channel change history, a value of number of switching times depending on a switching control operation, first and second reference levels for each of the image signal and the audio signal, and a value of a reference number of switching times.

The input unit 30 is a key input device including a broadcast channel selection key selecting the broadcast channel, and keys such as a volume control key and a power source key. The input unit 30 outputs key data on pressed keys to the controller 10. The input unit 30 can be also a touch pad device integrated with the display unit 70, which displays buttons at its one side for controlling the television, and when each of the buttons of a corresponding position is pressed, generating and outputting a coordinate value of the corresponding position to the controller 10.

The antenna switching unit 40 includes the plurality of antennas, and switches one of the plurality of antennas under the control of the controller 10 and receives a radio broadcast signal through the switched antenna.

The tuner 50 receives the radio broadcast signal from the antenna switching unit 40, and detects a broadcast signal of a desired broadcast channel under the control of the controller 10.

The image processor 60 receives the broadcast signal from the tuner 50, and filters the image signal from the received broadcast signal.

The image signal level detector 65 detects and outputs the signal level of the image signal to the controller 10.

The audio processor 80 receives the broadcast signal from the tuner 50, and filters the audio signal from the received broadcast signal.

The audio signal level detector 85 detects the signal level of the audio signal from the audio processor 80, and outputs the detected signal level to the controller 10.

The operation of the inventive device will be described below.

The controller 10 sequentially monitors the signal levels outputted from the image signal detector 665 and the audio signal level detector 85. If it is determined as the monitor result that the image signal level is less than a first reference level stored in the storage unit 20, the audio signal level is less than a second reference level, and the value of the number of switching times stored in the storage unit 20 is more than the value of the reference number of switching times, the controller 10 decides the desired broadcast channel with reference to the regional broadcast channel information for each broadcast station stored in the storage unit 20, controls the tuner 50, and changes the broadcast channel.

In the first embodiment of the present invention, the channel change history is used to decide the desired broadcast channel. For example, if a broadcasting station "A" uses channels of 1, 2, 3, 4, and 5 on a per-region basis and the channel change history of the television is numbers of 1 and 2, the controller 10 selects the channel of 3 at the time of next channel change. For another example, if the channel change history is numbers of 1, 2, 3, 2, the controller 10 selects the channel of 1 at the time of next channel change.

Figure 2:
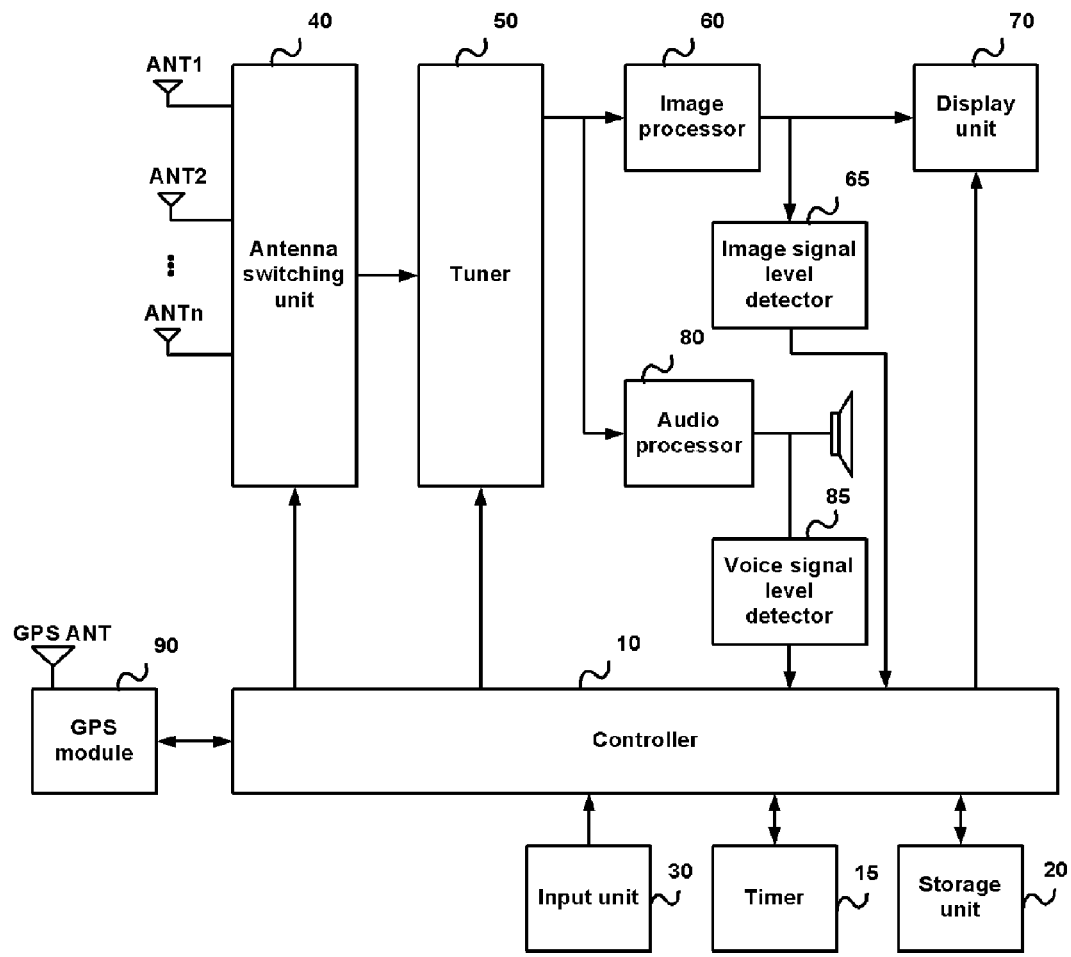
FIG. 2 illustrates a construction of a device for automatically changing a broadcast channel of a vehicle television with a diversity antenna according to the second embodiment of the present invention.

FIG. 2 illustrates a construction of a device for automatically changing a broadcast channel of a vehicle television with a diversity antenna according to the second embodiment of the present invention. The inventive device includes all of the constructions of FIG. 1, and further includes a GPS module 90 for receiving each satellite position signal from global positioning system (GPS) satellites and calculating a self position.

In the second embodiment of the present invention, the position is calculated using the GPS module 90, a region of the calculated position is determined, and a broadcast channel of the determined region is searched from regional broadcast channel information of each broadcasting station stored in the storage unit 20, and the broadcast channel is changed.

Figure 3:
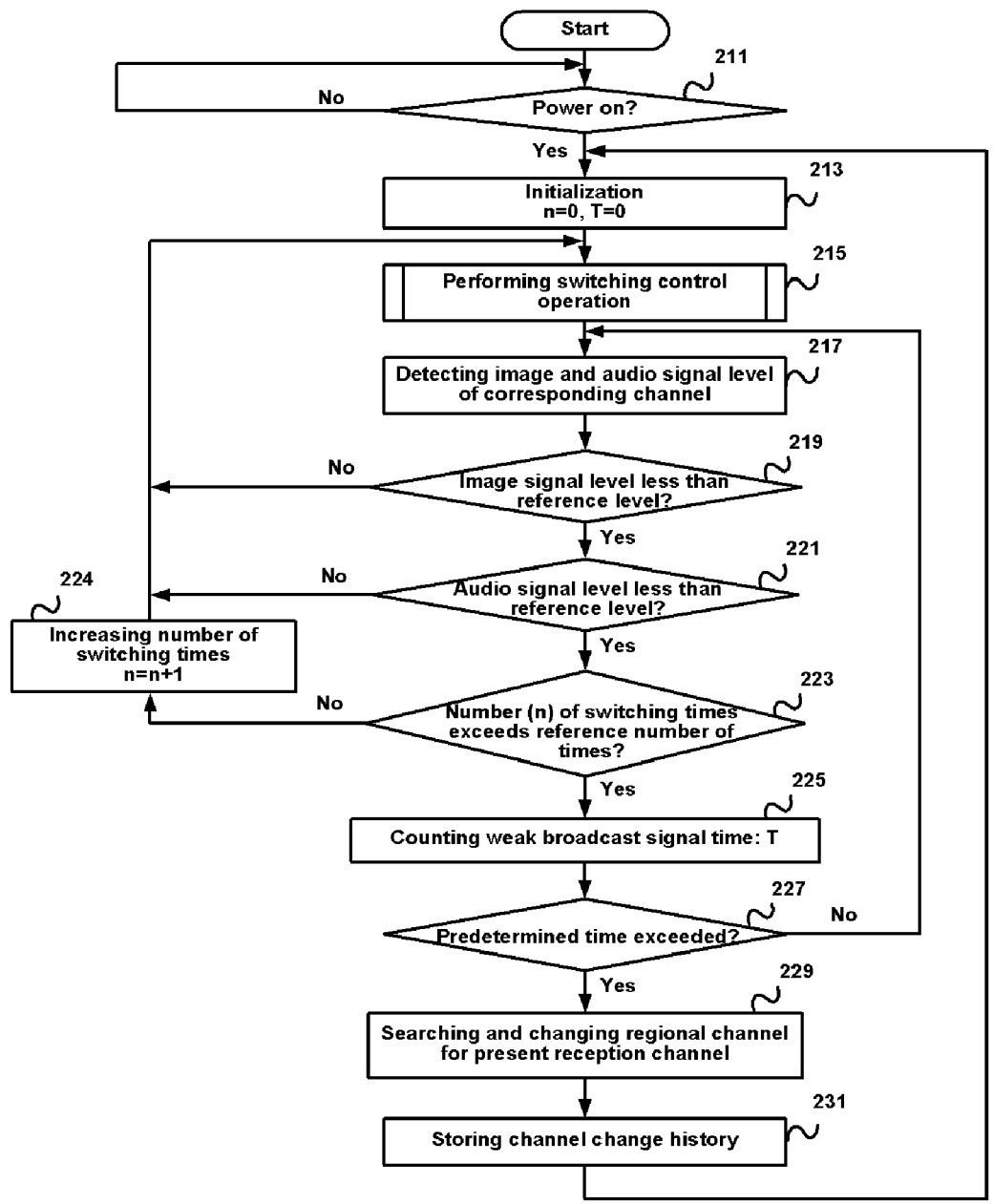
FIG. 3 is a flowchart illustrating a method for automatically changing a broadcast channel of a vehicle television with a diversity antenna according to the first embodiment of the present invention.

FIG. 3 is a flowchart illustrating a method for automatically changing a broadcast channel of a vehicle television with a diversity antenna according to the first embodiment of the present invention. The inventive method will be described with reference to FIGS. 1 to 3.

First, when a power source is turned on in Step 211, the controller 10 sets number (n) of times of switching the diversity antenna and a count time (T) to zero for initialization in Step 213.

After the initialization, in Step 215, the controller 10 receives the broadcast signal through the previously switched antenna, and performs a switching control operation. By the switching control operation, the controller 10 switches a diversity antenna receiving a broadcast signal having the most excellent quality from diversity antennas including a previously connected antenna, and receives the radio broadcast signal.

Upon receipt of the broadcast signal, in Step 217, the controller 10 receives and displays the image signal on the display unit 70 through the tuner 50 and the image processor 60, and outputs the audio signal through the tuner 50 and the audio processor 80 via a speaker. The image signal outputted to the display unit 70 is inputted to the image signal level detector 65, and the image signal level detector 65 detects and outputs the image signal level to the controller 10. The audio signal outputted through the speaker is inputted to the audio signal level detector 85, and the audio signal level detector 85 detects and outputs the audio signal level to the controller 10.

After the Step 217, in Step 219, the controller 10 determines whether or not the image signal level received from the image signal level detector 65 is less than the first reference level previously stored in the storage unit 20.

If the image signal level is determined to be less than the first reference level, in Step 221, the controller 10 determines whether or not the audio signal level received from the audio signal level detector 85 is less than the second reference level previously stored in the storage unit 20.

If it is determined as the determination result that the audio signal level is less than the second reference level, in Step 223, the controller 10 determines whether or not a counted number (n) of times of switching the diversity antenna (Hereinafter, referred to as "count number of times") exceeds a reference number of times of switching the diversity antenna (Hereinafter, referred to as "reference number of times").

If it is determined as the determination result that the count number of times does not exceed the reference number of times, Step 224 is performed and otherwise, Step 225 is performed.

In the Step 224, the controller 10 increases the count number of times by 1, and repeatedly performs the Step 215 and its subsequent steps.

On the contrary, in the Step 225, the controller 10 initiates to count a weak broadcast signal time, that is, the time (T) for which the Steps 219, 221 and 223 are satisfied.

If the weak broadcast signal time is counted, in Step 227, the controller 10 determines whether or not the count time exceeds a predetermined time. If the count time is determined not to exceed the predetermined time, the controller 10 performs the Step 217 and its subsequent steps. Otherwise, in Step 229, the controller 10 decides the broadcast channel with reference to the regional broadcast channel information and the channel change history for a present broadcasting station. Upon decision of the broadcast channel, the controller 10 controls the tuner 50 to change the broadcast channel into the decided broadcast channel.

Upon change of the broadcast channel, in Step 231, the controller 10 stores the changed broadcast channel in the channel change history.

Figure 4:
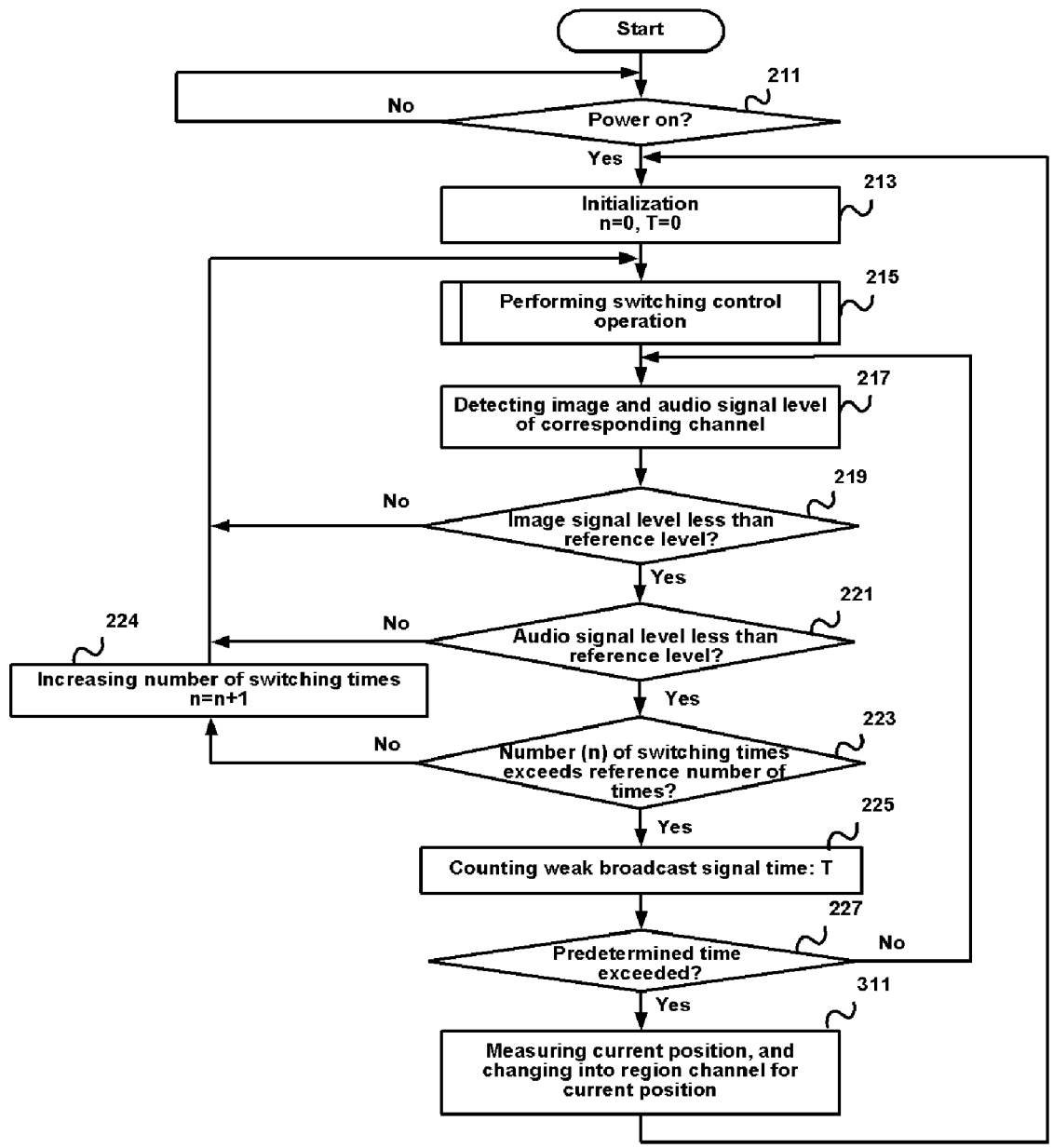
FIG. 4 is a flowchart illustrating a method for automatically changing a broadcast channel of a vehicle television with a diversity antenna according to the second embodiment of the present invention.

FIG. 4 is a flowchart illustrating a method for automatically changing a broadcast channel of a vehicle television with a diversity antenna according to the second embodiment of the present invention.

In the inventive method according to the second embodiment of the present invention, the same Steps 221 to 227 of FIG. 3 are performed, in Step 311 instead of the Steps 229 and 231 of FIG. 3, a current position is measured through a GPS module 90 of FIG. 2, a region for the measured current position is determined, a broadcast channel of a previous broadcasting station corresponding to the determined region is searched from regional broadcast channel information for broadcast stations stored in a storage unit 20, the broadcast channel is changed.

As described above, in the present invention, upon frequent generation of the antenna switching for the image signal and the audio signal, it is determined that the region is changed, and the broadcast channel is automatically changed into the broadcast channel of the corresponding region for the same broadcasting station and therefore, the driver does not need to directly change the broadcast channel. Accordingly, the present invention is advantageous of safety driving.

Further, in the present invention, the region determination is performed using the quality of the received broadcast signal and the GPS and therefore, a time point at which the broadcast channel is changed can be more exactly determined. Accordingly, the present invention has an advantage in that a driver's satisfaction can be improved.

While the present invention has been described with reference to exemplary embodiments thereof, it will be apparent to those skilled in the art that various modifications can be made therein without departing from the spirit and scope of the invention as defined by the appended claims and their equivalents.

What is claimed is:

1. A device for automatically changing a broadcast channel of a vehicle television with a diversity antenna, the device comprising:

an antenna switching unit connected with the diversity antennas and switching one of the diversity antennas under a predetermined control;

a tuner for receiving a radio broadcast signal through the switched antenna, and detecting a broadcast signal for a predetermined broadcast channel under a predetermined control;

an image processor for detecting an image signal from the broadcast signal;

an audio processor for detecting an audio signal from the broadcast signal;

an image signal level detector for detecting a signal level of the image signal;

an audio signal level detector for detecting a signal level of the audio signal;

a storage unit for storing regional broadcast channel information for each broadcasting station, a channel change history, a value of number of switching times depending on a switching control operation, first and second reference levels for each of the image signal and the audio signal, and a value of a reference number of switching times; and a controller for controlling the antenna switching unit to switch one of a plurality of the diversity antennas, counting and storing the number of switching times in the storage unit, checking a quality of the broadcast signal and, when it is determined that the quality is less than a predetermined reference level, deciding a desired broadcast channel with reference to the regional broadcast channel information for each broadcasting station, and controlling the tuner to change the broadcast channel into the decided broadcast channel.

2. The device according to claim 1, wherein when the detected image signal level is less than the first reference level, the audio signal level is less than the second reference level, and the counted number of switching times is more than the reference number of switching times, the controller determines that the quality of the broadcast signal is less than the predetermined reference level.

3. The device according to claim 1, wherein the desired broadcast channel is decided using the channel change history.

4. The device according to claim 2, wherein the desired broadcast channel is decided using the channel change history.

5. A device for automatically changing a broadcast channel of a vehicle television with a diversity antenna, the device comprising:

an antenna switching unit connected with the diversity antennas and switching one of the diversity antennas under a predetermined control;

a tuner for receiving a radio broadcast signal through the switched antenna, and detecting a broadcast signal for a predetermined broadcast channel under a predetermined control;

an image processor for detecting an image signal from the broadcast signal;

an audio processor for detecting an audio signal from the broadcast signal;

an image signal level detector for detecting a signal level of the image signal;

an audio signal level detector for detecting a signal level of the audio signal;

a storage unit for storing regional broadcast channel information for each broadcasting station, a channel change history, a value of number of switching times depending on a switching control operation, first and second reference levels for each of the image signal and the audio signal, and a value of a reference number of switching times;

a GPS (global positioning system) module for receiving each position signal from a plurality of GPS satellites, and calculating a self position; and a controller for controlling the antenna switching unit to switch one of a plurality of the diversity antennas, counting and storing the number of switching times in the storage unit, checking a quality of the broadcast signal and, when it is determined that the quality is less than a predetermined reference level, deciding a desired broadcast channel of a corresponding region of the calculated position with reference to the regional broadcast channel information for each broadcasting station, and controlling the tuner to change the broadcast channel into the decided broadcast channel.

6. The device according to claim 5, wherein when the detected image signal level is less than the first reference level, the audio signal level is less than the second reference level, and the counted number of switching times is more than the reference number of switching times, the controller determines that the quality of the broadcast signal is less than the predetermined reference level.

7. The device according to claim 6, wherein the desired broadcast channel is decided using the channel change history.

8. A method for automatically changing a broadcast channel of a vehicle television with a diversity antenna and a storage unit for storing regional broadcast channel information for each broadcasting station, a channel change history, a value of number of switching times depending on a switching control operation, first and second reference levels for each of the image signal and the audio signal, and a value of a reference number of switching times, the method comprising the steps of:

receiving an image signal and an audio signal through a switched antenna, and measuring signal levels of the image signal and the audio signal;

determining whether or not the measured image and audio signal levels are less than the first and second reference levels;

when the measured image and audio signal levels are less than the first and second reference levels, determining whether or not a counted number of switching times is more than the reference number of switching times; and when the counted number of switching times is less than the reference number of switching times, increasing the counted number of switching times by 1 and, when the counted number of switching times is more than the reference number of switching times, deciding one of regional broadcast channels of the broadcasting station for a present reception channel with reference to the regional broadcast channel information for the broadcasting stations, and changing the broadcast channel into the decided broadcast channel.

9. The method according to claim 8, wherein the broadcast channel is changed when it is maintained for a predetermined time in a condition that the image and audio signal levels are less than the first and second reference levels respectively and the counted number of switching times is more than the reference number of switching times.

10. The method according to claim 8, wherein a desired broadcast channel is decided using the channel change history.

11. A method for automatically changing a broadcast channel of a vehicle television with a diversity antenna, a GPS (global positioning system) module for receiving each position signal from a plurality of GPS satellites and calculating a self position, and a storage unit for storing regional broadcast channel information for each broadcasting station, a channel change history, a value of number of switching times depending on a switching control operation, first and second reference levels for each of the image signal and the audio signal, and a value of a reference number of switching times, the method comprising the steps of:

receiving an image signal and an audio signal through a switched antenna, and measuring signal levels of the image signal and the audio signal;

determining whether or not the measured image and audio signal levels are less than the first and second reference levels;

when the measured image and audio signal levels are less than the first and second reference levels, determining whether or not a counted number of switching times is more than the reference number of switching times; and when the counted number of switching times is less than the reference number of switching times, increasing the counted number of switching times by 1 and, when the counted number of switching times is more than the reference number of switching times, searching a region of the calculated position from the regional broadcast channel information for the broadcasting stations, deciding a desired broadcast channel, and changing the broadcast channel into the decided broadcast channel.

* * * * *